United States Patent [19]

Soeteber

[11] 4,425,007

[45] Jan. 10, 1984

[54] TREAD BELT LINK AND COOPERATING DRIVE TUMBLER

[75] Inventor: Ronald J. Soeteber, New Berlin, Wis.

[73] Assignee: Bucyrus-Erie Company, South Milwaukee, Wis.

[21] Appl. No.: 233,856

[22] Filed: Feb. 12, 1981

[51] Int. Cl.$^3$ .................... B62D 55/12; B62D 55/20
[52] U.S. Cl. ........................................ 305/11; 305/53; 305/57; 474/92; 474/164; 474/901
[58] Field of Search ................ 474/92, 901, 152, 155, 474/156, 164; 305/11, 13, 53, 57

[56] References Cited

U.S. PATENT DOCUMENTS

| | | | |
|---|---|---|---|
| 1,549,594 | 8/1925 | Menningen | 474/164 |
| 1,668,778 | 5/1928 | Menningen | 474/164 |
| 1,877,135 | 9/1932 | Knox | 305/57 X |
| 1,922,357 | 8/1933 | Divney et al. | 474/901 X |
| 2,530,379 | 11/1950 | Davidson . | |
| 2,727,794 | 12/1955 | Davidson et al. . | |
| 2,854,294 | 9/1958 | Bannister | 305/53 |
| 3,680,928 | 8/1972 | Kraschnewski et al. | 305/57 |
| 3,880,478 | 4/1975 | Baylor | 474/901 X |
| 4,175,797 | 11/1979 | Krekeler | 305/53 |
| 4,278,301 | 7/1981 | Gregor et al. | 305/11 |

OTHER PUBLICATIONS

Bucyrus-Erie One Page Advertisement, Undated, Admitted Prior Art, Showing 15H Drive System Labeled Exb. 5a.
Three Pages of Bucyrus-Erie Photos, Undated, Admitted Prior Art, Showing 40H Drive System, Labeled Exb. 5b.
Koehring Two Page Advertisement, Undated, Admitted Prior Art, Showing 1066C Drive System, Labeled Exb. 5c.
A Manitowoc Two Page Advertisement Showing 4000W Drive System, Undated, Admitted Prior Art, Labeled Exb. 5d.
A Twelve Page Manitowoc Catalog Showing the 2300 Drive System, Undated, Admitted Prior Art, Labeled Exb. 6a.
A Manitowoc Four Page Brochure Dated Jan. 19, 1965, Entitled "Wide Track 2300 W."

Primary Examiner—David A. Scherbel
Attorney, Agent, or Firm—Quarles & Brady

[57] ABSTRACT

A drive system comprising an endless tread belt made up of identical tread belt links and a cooperating drive tumbler is disclosed. The link is formed with a ground engaging bottom face, a drive wheel engaging top face, and connecting ears along its forward and aft sides which are suitable to interdigit with the ears of other links so as to form a belt. The link also has a guiding cog rising upwardly from the central region of the top face, a bearing surface on each lateral side of the guiding cog, aligned drive surfaces on the forward and aft sides of the guiding cog located between the link bottom face and link top face, and a slot in alignment with the drive surfaces. The cooperating drive tumbler is formed with a drive wheel having a plurality of circumferentially spaced teeth projecting radially outward from the wheel; two rows of segmented bearing rims alternately offset laterally from each other on the sides of the teeth, the segments of each row being circumferentially spaced and being formed such that the teeth extend radially beyond the segments; and a plurality of pockets located between the teeth that open radially outward, and open laterally from the tumbler wheel between the rim segments.

5 Claims, 9 Drawing Figures

TREAD BELT LINK AND COOPERATING DRIVE TUMBLER

BACKGROUND OF THE INVENTION (a) Field of the Invention

The present invention relates to a drive system for heavy machinery having a creeping traction unit. More particularly, it relates to improved links which are joined together by connecting pins to form an endless tread belt for the drive system, and to an improved cooperating tumbler which drives the belt.

(b) Description of the Art

Tread belt drives useful for propelling large machinery and other heavy mobile equipment which are forerunners for the present invention are shown in U.S. Pat. Nos. 2,530,379, 2,727,794, 3,680,928, and 4,278,301. In these patents, a drive system is described in which the number of links which are driven by the teeth of the drive tumbler at any given moment of time is less than the number of links which are wrapped around the tumbler. This type of system has the advantage of providing for more even wear of the links and is achieved by having the pitch angle between the tumbler teeth larger than the pitch angle of the links.

The pitch angle of the tumbler teeth is the angle at the center of the tumbler which is subtended by a line drawn from the midpoint of one tooth to the midpoint of an adjacent tooth. The pitch angle of the links is the angle at the center of the tumbler that is subtended by a line drawn from the center of the pivot pin connection of one link to the pivot pin connection of an adjacent link. A detailed discussion of pitch angles and their measurement appears in U.S. Pat. No. 2,727,794.

The described prior art type of tread belt drive system provides a practical and effective way of propelling large excavating equipment. However, the use of such tread belt drive systems is not without problems. For example, heavy machinery having tread belts are often used at excavation and construction sites where they may be exposed to extremely dirty and rocky areas. Because tread belts are typically open at the side, dirt and stones may enter and pack between the links and the drive wheel. This may cause the tension on the belt to increase, which in some cases may damage the drive motor, the drive gear box, the tumbler wheel drive teeth, the connections between links, and/or cause jamming of the belt. While some prior art systems have self-cleaning features which are useful in lowering the likelihood of this occurring, it is desirable to improve the self-cleaning characteristics of prior art tread belt drive systems still further.

Other problems which can occur in some prior art systems include breakage of the links or the teeth of the drive system when a link which is being driven by a tumbler tooth is forced radially outward of the tumbler wheel in response to the driving forces. When this happens, there can be a loss of proper driving engagement between the tumbler tooth and the link, and as the link falls back towards the tumbler, the link may improperly strike a tumbler tooth and cause a fracture of either one or both of the members making repairs necessary.

Also, due to the wear of the bearing surfaces of the tumbler and the links, the pitch angle of the links may tend to increase, and the pitch angle of the tumbler may tend to decrease. When the pitch angle of the links exceeds the tumbler pitch angle, the necessary driving relationship of the tumbler to the links is lost, and the links and/or tumbler must be rebuilt or replaced. Still another problem is the fact that many prior art systems are noisy and rough in operation.

In addition to these factors, because of the rising cost of the raw materials and other inputs which are used in producing heavy machinery, the production cost of many of these machines has increased considerably. To lower the cost of production, it is desirable to have a link which can be easily cast without the need for expensive machining, and which has a symmetry line such that if the casting is slightly irregular, and the belt when assembled is slightly out of line, rather than wasting several links, one or more links can be rotated 180 degrees to correct the alignment.

Therefore, it can be seen that the need exists for a tread belt drive system which improves upon the performance of prior systems in dealing with these problems.

SUMMARY OF THE INVENTION

The present invention generally relates to a drive system and more particularly to an improved tread belt link for an endless tread belt and an improved cooperating tumbler drive wheel.

The link of the present invention has a ground-engaging bottom, a drive wheel-engaging top face, and connecting ears along its forward and aft sides which are suitable to interdigit with the ears of other links. In the central region of the top face, a guiding cog rises upwardly. There are also bearing surfaces on each lateral side of the guiding cog, aligned drive surfaces on the forward and aft sides of the guiding cog located between the link bottom and link top face, and a slot in alignment with the drive surfaces.

The cooperating tumbler drive wheel of the present invention has a plurality of circumferentially spaced teeth projecting radially outward from the wheel; two rows of segmented bearing rims alternately offset laterally from each other on the sides of the teeth, the segments of each row being circumferentially spaced and being formed such that the teeth extend radially beyond the segments; and a plurality of pockets located between the teeth that open radially outward, and open laterally from the tumbler wheel between adjacent rim segments.

In the preferred embodiment, when a series of the links are connected together into an endless belt and the belt is placed around the tumbler wheel, the teeth of the wheel project into a hole formed by the slots, between the forward and aft drive surfaces of adjacent links, and the alternating rims of the tumbler wheel bear against the bearing surfaces of the link. The guiding cog on the tread belt link projects into the pockets located between the tumbler wheel teeth.

This drive system allows dirt and stones to be expelled in at least three directions. First, dirt can be expelled through the hole formed by the slots out the bottom of the links. Second, dirt can be pushed radially inward by the guiding cog into the alternating pockets and then laterally out the sides of the pockets. Finally, dirt may be expelled laterally along the link. This improved self-cleaning feature reduces the likelihood of wear and damage to the system due to the entry of dirt and stones.

In the preferred embodiment of the drive system, the aligned drive surfaces are located between the link bottom and link top face so that the tumbler drives the link near the pin connection centers between adjacent links. Therefore, a smooth drive is obtained because excessive torque about the link pins is not created when the links are driven. This also lowers the tendency of the wheel to lift the link radially outward and thereby cause the teeth or links to be damaged. Another advantage of this construction is noise reduction because the noisy reactions to the torque forces does not occur to the same degree as with prior art systems which do not drive near the pin centers.

Further, in the preferred embodiment the pitch angle between tumbler teeth is greater than the pitch angle of the links when the system is manufactured. Some wear of the tumbler and the links can therefore occur before the pitch angle of the links will exceed the tumbler pitch angle.

In addition to its other advantages, the preferred embodiment provides a smoother operating system because when the links are joined together, a nearly continuous rim and roller bearing surface on the links is provided. The bearing surfaces on each link extend forward and aft of the guiding cog. When links are joined together, the openings between bearing surfaces of adjacent links are staggered on opposite sides of the cog so that the tumbler rims and support rollers will not run over openings on both sides of the cog at the same time.

Also, in the preferred embodiment, the link is symmetrical along a 180 degree line of rotation to improve assembly characteristics and is formed so as to be easily cast without the need for expensive machining. Further, as a double track bearing surface is used, the stability of the belt to tipping sideways is improved.

The objects of the invention therefore include:
a. providing a tread belt link and cooperating drive tumbler of the above kind which has a three directional self-cleaning feature;
b. providing a tread belt link and cooperating drive tumbler of the above kind in which the tumbler drive wheel drives the belt at or near the pin centers;
c. providing a tread belt of the above kind in which the link may be relatively inexpensively produced without the need for expensive machining; and
d. providing a tread belt link of the above kind in which the link has a degree of symmetry so as to ease assembly of the tread belt.

These and still other objects and advantages of the invention will be apparent from the description which follows. In the detailed description which follows, the preferred embodiments of the invention will be described in reference to the accompanying drawings. These embodiments do not represent the full scope of the invention, but rather the invention may be employed in other embodiments. Reference is made to the claims herein for interpreting the breadth of the invention.

DESCRIPTION OF THE PREFERRED EMBODIMENT

Figure 1:
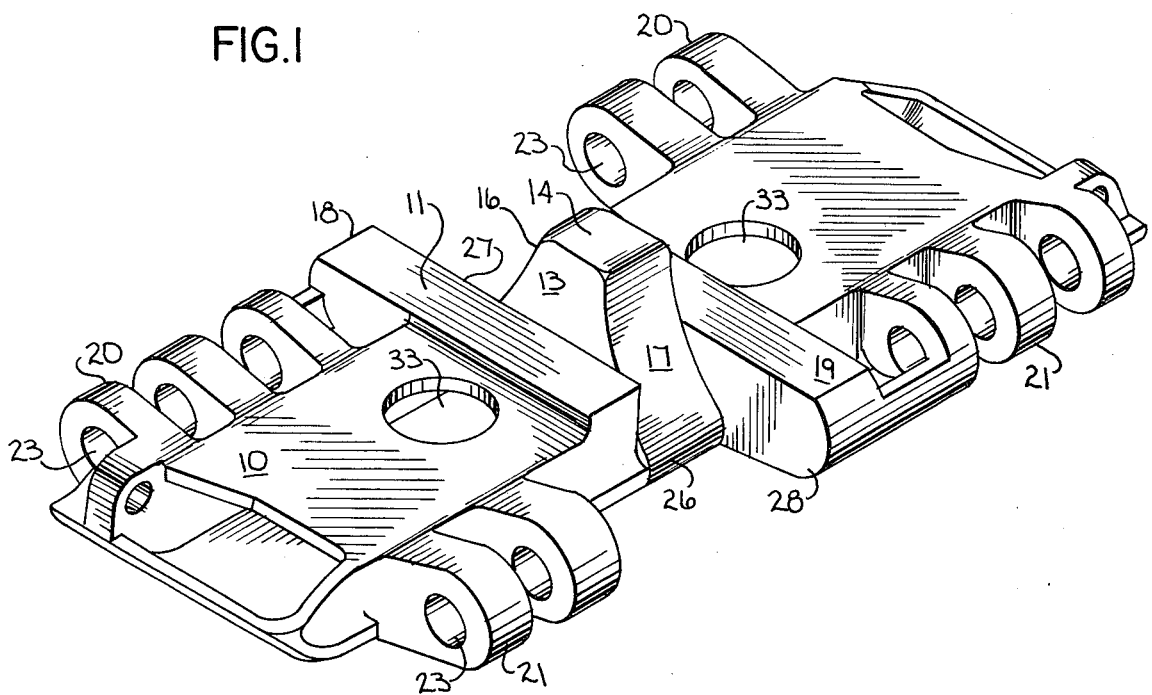
FIG. 1 is a perspective view of the preferred tread belt link of the present invention.
Figure 3:
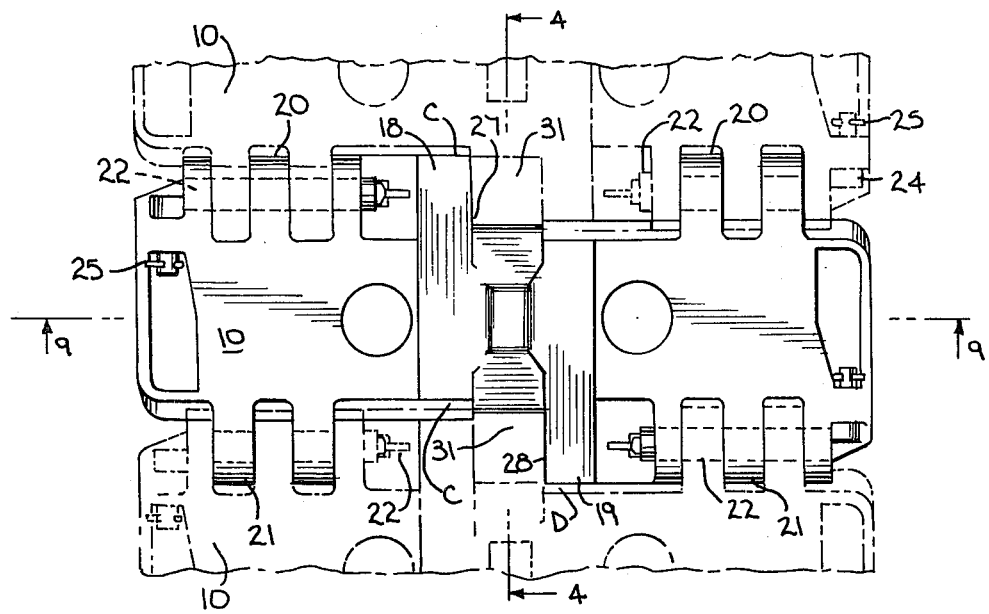
FIG. 3 is a top plan view of the link of FIG. 1 which has been attached by connecting pins to two adjacent identical links.

Referring now to FIGS. 1 and 3, there is shown a tread belt link 10 which can be used in a drive system for mobile machinery. A number of such links may be joined together to form an endless ground engaging tread belt. Such belts can be disposed at the base on each side of a machine such as an excavator or a tractor to cause the machine to move.

The endless belt will normally pass under conventional rollers (not shown) that support the machine proper and the belt will then mesh with a cooperating drive tumbler wheel 40 (see FIG. 6) which is located at one end of the belt and then travel around to a conventional toothless idler tumbler (not shown) at the other end of the belt. This provides a drive system for propelling the machine along the ground.

For purposes of clarity in the following description of the preferred embodiment, the direction of travel of the links in the drive system when the machine is moving forward will be called the forward direction and the direction of travel of the links when the machine is moving in reverse will be called the aft direction. Further, the direction across the link from one end to another will be referred to as the lateral direction.

To further facilitate description, the direction through the link 10 from the drive wheel engaging top face 11 towards the bottom face 12 of the link will be referred to as radially outward, and the direction from the bottom face 12 of the link 10 towards the drive wheel engaging top face 11 will be referred to as radially inward.

It can be seen that the link 10 shown in FIG. 1 has a guiding cog 13 which rises upwardly from the central region of the top face 11. The cog 13 may be formed with a flattened top 14 and sloping sides 16 and 17 which slope towards the forward and aft directions, respectively. Adjacent to the guiding cog 13, on each lateral side thereof, are rectangular shaped, flat bearing surfaces 18 and 19. It will be appreciated that the guiding cog 13 rises above these bearing surfaces, that bearing surface 18 is extended forward beyond the forward terminus of the cog 13, and that bearing surface 19 is extended aft beyond the aft terminus of the cog 13.

The link 10 is further provided with a first set connecting ears 20 along the forward end of the link body, and a second set of connecting ears 21 along the aft end of the link 10. The forward connecting ears 20 have a degree of symmetry with the aft connecting ears 21. If the link were to be rotated 180 degrees around an axis extending through the center of the guiding cog 13 which is perpendicular to the plane of top face 11, the link would appear substantially identical to one viewing the link from a fixed position.

Links 10 can be connected together as in FIG. 3 by inserting the forward connecting ears 20 of one link between the aft connecting ears 21 of the next link, thereby interdigiting them together. Appropriate connecting pins 22 can be inserted in the aligned openings 23 in the interdigited ears, and the pins 22 secured in place by suitable fastening means such as a T-bolt 24 and a cotter pin 25. Four bolts, four connecting pins, and four cotter pins are used to complete the attachment of two additional links to a first link.

Figure 2:
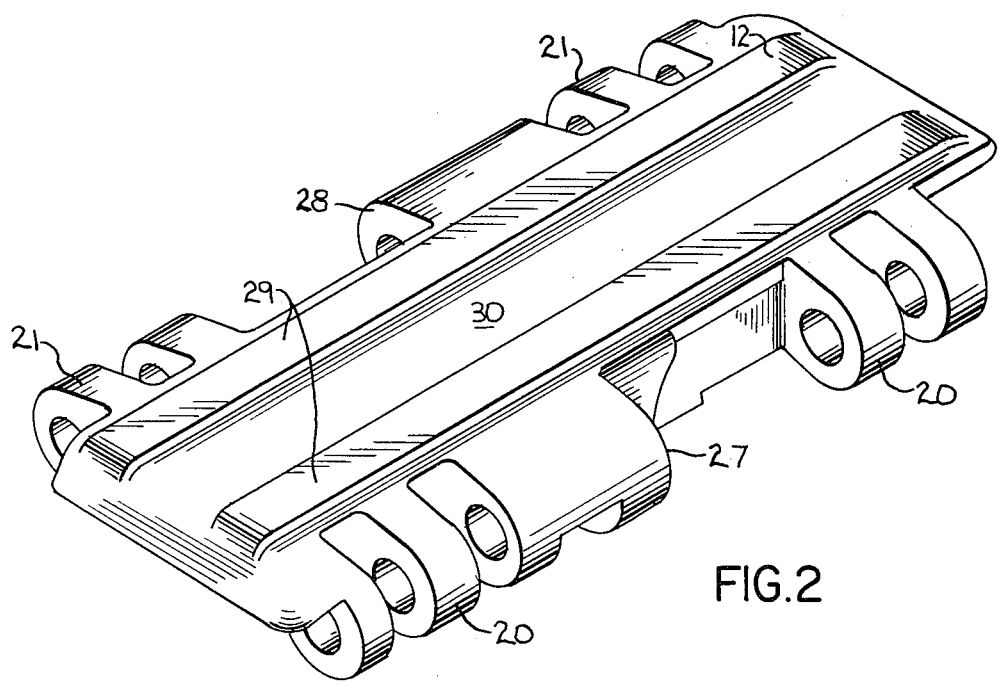
FIG. 2 is a second perspective view of the link of FIG. 1, taken from below the link.
Figure 4:
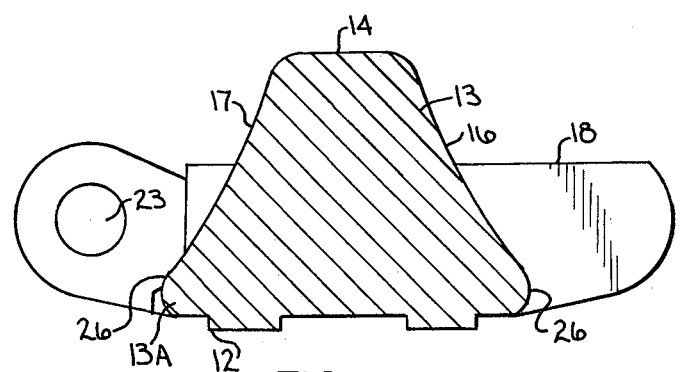
FIG. 4 is an enlarged cross-sectional view of a link taken along line 4—4 in FIG. 3.

Continuing now with reference to FIGS. 1, 2, and 4, on the forward 16 and aft 17 sides of the guiding cog 13, located between the link bottom face 12 and link top face 11, there are drive surfaces 26. There are also forward and aft slots 27 and 28 which are cut between connecting ears in alignment with the drive surfaces. As seen best in FIG. 2, for improved traction, the link bottom face 12 is provided with a pair of treads 29 separated by a longitudinal groove 30.

With particular reference to FIG. 3, it can be seen that when two or more links are placed together, forward slot 27 of one link and aft slot 28 of the next link form a rectangular space or opening 31 between the two links. The opening 31 between links is of sufficient size to receive a drive tooth 41 (FIG. 6) of the tumbler drive wheel 40, and also allow material to pass radially outward between the link top face 11 and link bottom face 12 when the links are attached together.

Figure 5:
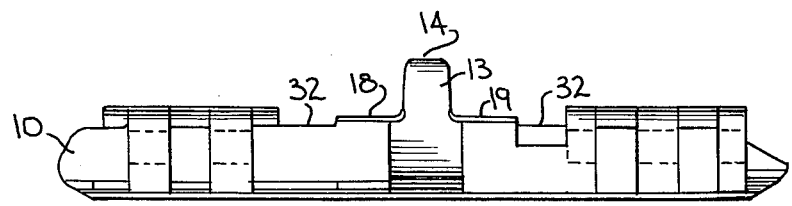
FIG. 5 is a front-elevational view of the link shown in FIG. 1.

Turning now to FIGS. 4 and 5, the guiding cog 13 is shown as nearly trapezoidal in cross section with the bottom portion 13A being slightly rounded. This construction allows the drive surfaces 26 to make smoother contact with tumbler teeth 41. It will further be appreciated from FIG. 5 that in the preferred embodiment the top 14 of the cog 13 rises above the bearing surfaces 18 and 19 and that they are of a greater height than the remainder of the link (see adjacent surfaces 32).

Figure 6:
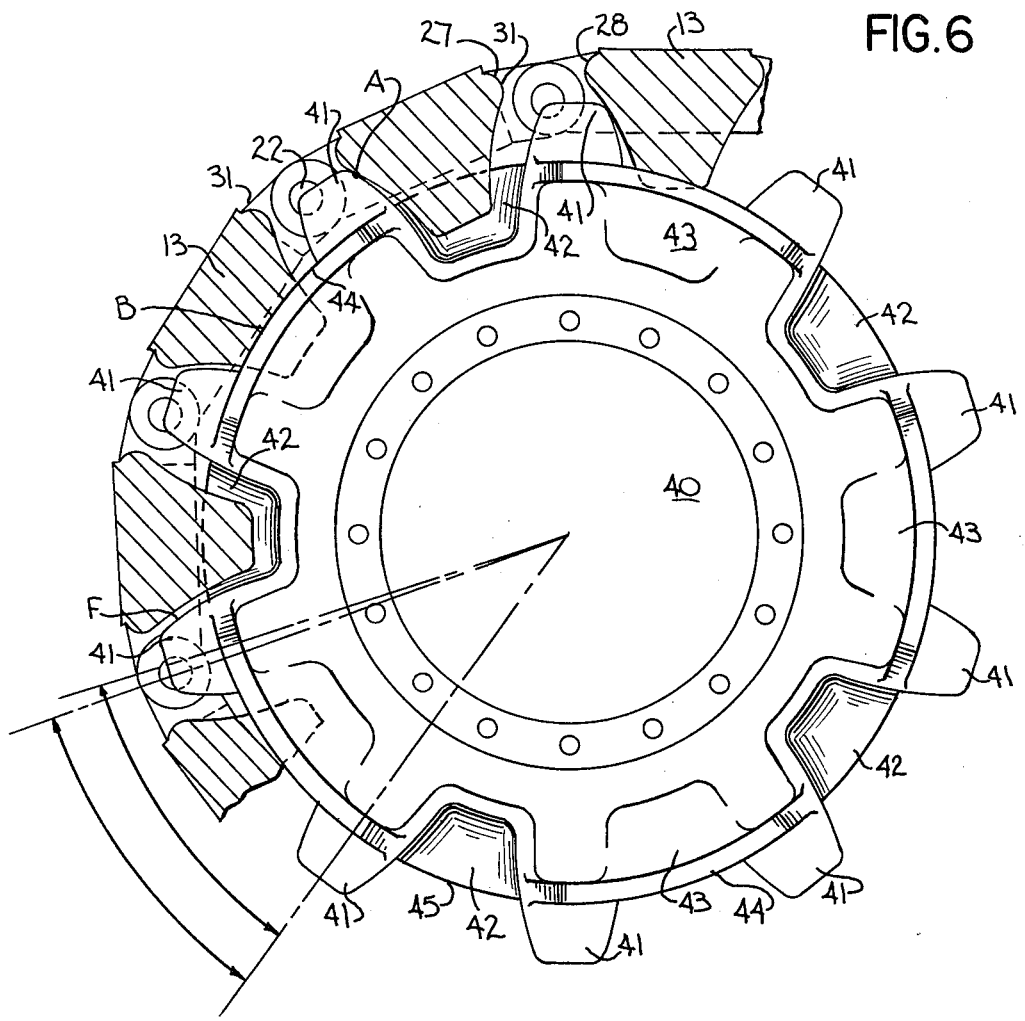
FIG. 6 is a partial sectional view of the drive system showing a belt made up of links such as that shown in FIG. 3 engaged with the cooperating drive tumbler of the present invention, the tumbler being viewed from the side.

In FIG. 6, there is shown a belt of links 10 mounted on a tumbler wheel 40. The drive wheel 40 has a plurality of circumferentially spaced teeth 41. There are ten of such teeth regularly spaced around the periphery of the drive wheel 40. Between the teeth 41, there are a first set of five pockets 42 that open radially outward and laterally towards the viewer. There is also a second set of five pockets 43 which alternate with the first set around the wheel and that open radially outward and open laterally from the tumbler wheel away from the viewer.

Figure 7:
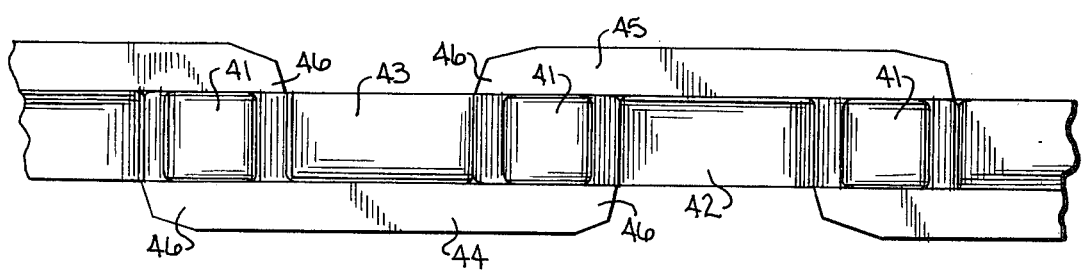
FIG. 7 is a schematic top view of the tumbler wheel of FIG. 6.

As shown most clearly in FIG. 7, adjacent to the aligned teeth 41 and alternate pockets 42 and 43, are two rows of segmented bearing rims 44 and 45 which are alternately offset laterally from each other on the sides of the teeth, the segments of each row being circumferentially spaced around the periphery of the wheel 40, and being formed such that the teeth 41 extend radially outward beyond the segmented rims 44 and 45. This last feature can be seen in FIG. 6 at point A. At point A, tooth 41 is extending beyond segmented rim 44. Further to detail the structure of the tumbler wheel, teeth 41 are formed near the termini 46 of segmented rims 44 and 45, and the middle segment of the rims form the sides of the pockets 42 and 43.

It will also be appreciated that tooth 41 at point A is driving the belt at or near the centers of pins 22 between connecting links. The tooth 41 reaches this point by projecting into the radial opening 31 formed by slots 27 and 28. The tooth 41 drives against a driving surface 26 on the cog 13, thereby propelling the link belt. As driving occurs at or near the pin centers, the noise of the device is reduced and the likelihood of excessive torque forces causing damage is reduced.

When assembled together, the alternating segmented rims 44 and 45 bear against bearing surfaces 18 and 19 as at point B in FIG. 6. It can also be seen that when the links are attached together as in FIG. 3, the break C between the bearing surfaces 18 of respective links is always staggered from the break D between the bearing surfaces 19 of respective links. As such, there will never be a point where the rims 44 and 45 must simultaneously roll over both breaks C and D. To further improve the smoothness of the system, the guiding cogs 13 ride alternately in the alternating pockets 42 and 43 and lend lateral stability to the system.

As shown in FIG. 6, the system is constructed such that the pitch angle of the links is less than the pitch angle of the tumbler teeth. Not all of the teeth 41 of the tumbler 40 which are contacting the links will perform a driving function at the same time. For example, while a tooth 41 may be driving a cog 13 at point A, at point F another tooth will not have yet reached the point of driving because of the difference in the pitch angles. This construction has the advantages previously discussed.

Figure 8:
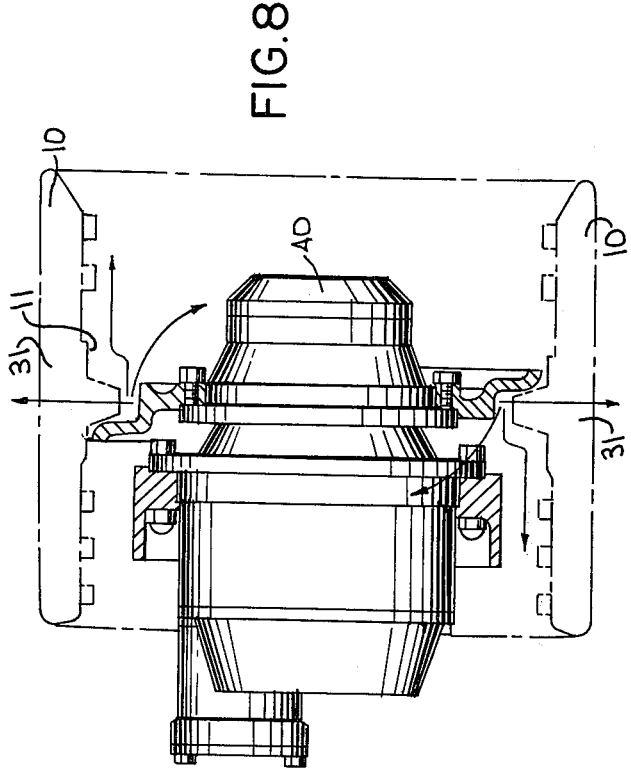
FIG. 8 is a schematic view, partly in section, showing the relationship of a tread belt made up of the preferred links and the cooperating drive tumbler, with arrows illustrating the various paths by which dirt can be expelled from the drive system.
Figure 9:
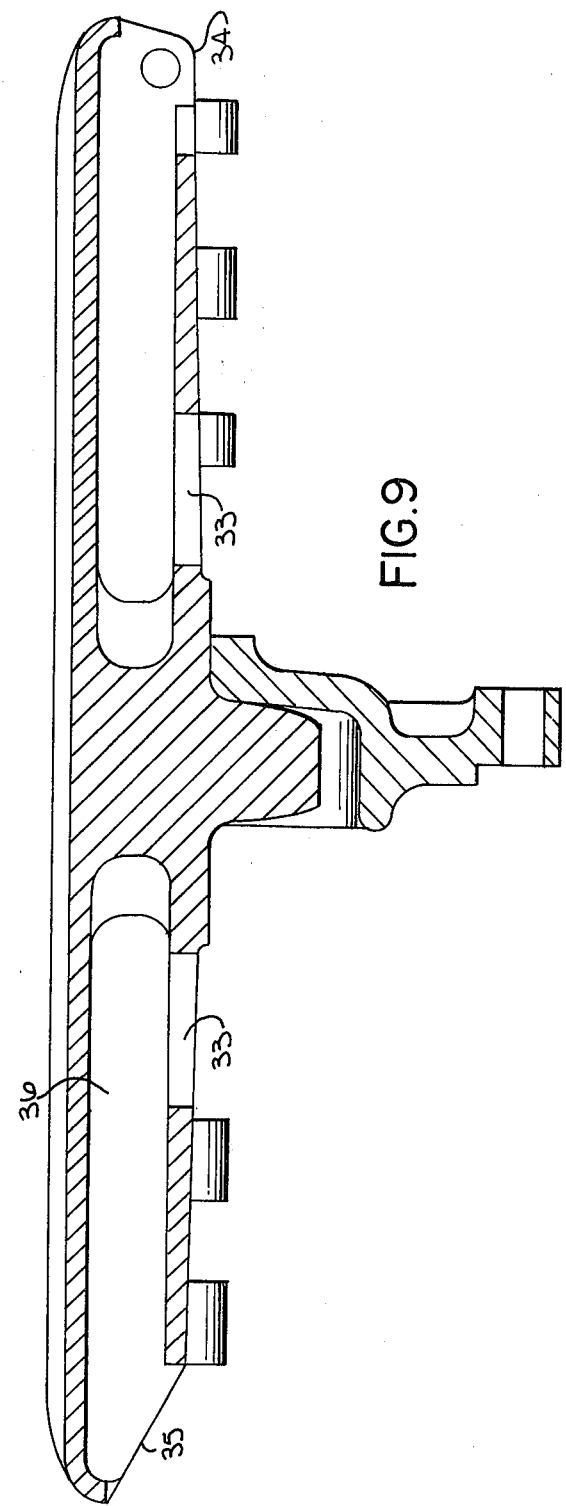
FIG. 9 is a cross-sectional view of a link taken along line 9—9 in FIG. 3 which is shown engaged with a tumbler pocket of the drive tumbler.

The working of the system can further be appreciated from FIGS. 8 and 9. As shown in these views, the system of the invention allows dirt and stone removal in at least three directions. First, dirt and stones can be removed through the radial opening 31 formed by slots 27 and 28 between adjacent links in a radially outward direction. Second, dirt and stones can be removed laterally along the top face 11 of the link body. This is assisted by the fact that the bearing surfaces 18 and 19 are slightly higher than the adjacent surfaces 32 such that dirt will not trap laterally around the cog. Finally, dirt may be projected inwardly by guiding cog 13 into the alternating pockets 42 and 43. Because one lateral side of the pockets is open, dirt may be pushed inwardly by the cog 13 and then laterally outward. The combination of these possibilities provides for an improved self-cleaning capability.

Because of the shape of the link 10 and its symmetry, it is highly suitable for casting. Various casting holes and cutouts such as openings 33, 34, 35 and 36 in FIG. 9 can be formed in the link to make casting easier and reduce weight. Further, in the event that the casting is not precisely perfect, and the links when connected together into a belt are slightly out of line, one or more links can be turned 180 degrees to offset the irregularity and straighten out the line. Thus, there is no need for expensive machining.

The link can be formed of conventional casting metals. To improve the wear resistance of the conventional metals, the bearing surfaces 18 and 19 can be heat treated. In sum, then, the novel tread belt link and cooperating drive tumbler improve upon the performance of the prior art drive systems in dealing with the problems described above.

Although especially preferred embodiments have been described above, it should be appreciated that the invention is not so limited. There may be various other modifications and changes to these embodiments which are within the scope of the invention. Such modifications and changes are meant to be within the scope of the invention. Therefore, the invention is not to be limited by the illustrative description above, but only by the claims which follow.

I claim:

1. In a tread belt drive the combination of:

a tumbler wheel having a segmented rim, the rim having its segments alternately offset laterally from one another to form two rows of rim segments in which the segments of each row are circumferentially spaced from one another; a plurality of driving teeth positioned between the rows, the teeth projecting radially outwardly therefrom and being in locations alongside the termini of said rim segments; at least one of said teeth being positioned relative to said rim segments such that it has a rim segment on at least a portion of each lateral side thereof and it extends radially outward from both of said laterally positioned rim segments; and pockets located between said driving teeth that open both radially outward and laterally from the tumbler wheel;

a plurality of links connected to one another to form a tread belt and engageable with said tumbler wheel, the links having a link body that has a ground engaging bottom and an upper face; a guiding cog rising upwardly from the central region of said top face that is receivable within a pocket of said tumbler wheel; a bearing surface on the upper face on each lateral side of said guiding cog that rides upon a rim segment of said tumbler wheel; a driven surface on the forward and aft sides of the cog that is located between the link bottom and the link top face and in vertical alignment with the cog to be engaged by the tumbler teeth; and connecting lugs along the forward and aft sides of the link body that interdigit with lugs of adjacent links for connection therewith, said connecting ears having connection openings with centers located beneath said bearing surfaces; and said links when connected together forming openings between the bearing surfaces of adjacent links which are open at the link bottoms and which receive said tumbler driving teeth.

2. In a tread belt drive the combination of:

a tumbler wheel having a plurality of circumferentially arranged pockets spaced from one another, each pocket being open both at its radially outward periphery and in a lateral direction; a plurality of teeth located between said pockets and extending radially outward therefrom; and a segmented rim with spaced portions alongside said pockets and teeth;

at least one of said teeth being positioned relative to said rim segments such that it has a rim segment on at least a portion of each lateral side thereof and it extends radially outward from both of said laterally positioned rim segments; and a plurality of tread belt links in meshing engagement with said tumbler wheel, each link having a ground engaging bottom and an upper surface spaced above said bottom; a centrally located lug rising above said upper surface and receivable in a tumbler wheel pocket; a tooth engaging surface on the forward and aft sides of the link that extends downwardly from said lug and lies between said ground engaging bottom and said upper surface; and connecting means along the forward and aft sides of the link for joining with adjacent links, connected links forming an opening between facing tooth engaging surfaces of adjacent links, the opening suitable to receive a tumbler tooth, said tooth being engageable with said tooth engaging surface at a level lying between said ground engaging bottom and said upper surface, and also beneath the portion of said lug rising above said upper surface; and said upper surface having a portion bearing upon said tumbler wheel rim.

3. A tumbler wheel for a tread belt drive comprising:

a drive wheel having a plurality of circumferentially spaced teeth projecting radially outward from the wheel;

two rows of segmented bearing rims alternately offset laterally from each other on the sides of the teeth, the segments of each row being circumferentially spaced and being formed such that the teeth extend radially beyond the segments;

a plurality of pockets located between the teeth, the pockets opening radially outward, and opening laterally from the tumbler wheel between the rim segments; and at least one of said teeth being positioned relative to said rim segments such that it has a rim segment on at least a portion of each lateral side thereof and it extends radially outward from both of said laterally positioned rim segments.

4. The tumbler wheel of claim 3 in which the teeth of the tumbler wheel are located adjacent the termini of the rim segments.

5. The tumbler wheel of claim 3 in which the pockets are circumferentially and regularly spaced around the periphery of the wheel.

* * * * *